(12) United States Patent
Lopez et al.

(10) Patent No.: US 12,526,063 B2
(45) Date of Patent: Jan. 13, 2026

(54) RECEIVER, TRANSMITTER, DEVICE, METHODS AND COMPUTER PROGRAMS FOR FEEDBACK SENSING

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 369 days.

(21) Appl. No.: 18/043,977

(22) PCT Filed: Sep. 15, 2020

(86) PCT No.: PCT/EP2020/075698
§ 371 (c)(1),
(2) Date: Mar. 3, 2023

(87) PCT Pub. No.: WO2022/057996
PCT Pub. Date: Mar. 24, 2022

(65) Prior Publication Data
US 2023/0318721 A1    Oct. 5, 2023

(51) Int. Cl.
*H04B 17/20* (2015.01)
*H04L 43/06* (2022.01)

(52) U.S. Cl.
CPC ............ *H04B 17/25* (2023.05); *H04L 43/06* (2013.01)

(58) Field of Classification Search
CPC .................. H04B 17/25; H04L 43/06
See application file for complete search history.

(56) References Cited

U.S. PATENT DOCUMENTS

| 10,779,343 | B2* | 9/2020 | Wei .................. H04W 76/14 |
| 11,956,677 | B2* | 4/2024 | Krishnan ............. H04W 24/08 |
| 2016/0330732 | A1 | 11/2016 | Moon et al. |
| 2019/0261369 | A1 | 8/2019 | Verma et al. |
| 2022/0279379 | A1* | 9/2022 | He ................... H04W 28/0284 |

FOREIGN PATENT DOCUMENTS

WO    2012093794 A2    7/2012

OTHER PUBLICATIONS

International Search Report and Written Opinion dated May 25, 2021 for International Application No. PCT/ EP2020/075698 filed Sep. 15, 2020, consisting of 9 pages.
Allegue et al. "Wi-Fi Sensing: Technical Feasibility, Standardization Gaps"; IEEE 802.11-17/1850r0; Nov. 2019, consisting of 27 pages.
Da Silva, Claudio "802.11 SENS SG Proposed PAR"; IEEE 802.11-19/2103r4; Jan. 2020, consisting of 4 pages.

* cited by examiner

*Primary Examiner* — Chandrahas B Patel
(74) *Attorney, Agent, or Firm* — Weisberg I.P. Law, P.A.

(57) ABSTRACT

An approach is provided for sensing changes in a physical environment, where a transmitter transmits a request for measurement of at least one symbol. The request includes an identifier and an indication of the at least one symbol. A signal comprising the at least one symbol is transmitted, and a measurement report for the at least one symbol is received. A receiver receives a request for measurement of at least one symbol in which the request includes an identifier and an indication of the at least one symbol. A signal including the at least one symbol is received. Measurements are reported on the at least one symbol to provide a measurement report, and the measurement report is transmitted.

27 Claims, 5 Drawing Sheets

RECEIVER, TRANSMITTER, DEVICE, METHODS AND COMPUTER PROGRAMS FOR FEEDBACK SENSING

CROSS-REFERENCE TO RELATED APPLICATION

This application is a Submission Under 35 U.S.C. § 371 for U.S. National Stage Patent Application of International Application Number: PCT/EP2020/075698, filed Sep. 15, 2020 entitled "RECEIVER, TRANSMITTER, DEVICE, METHODS AND COMPUTER PROGRAMS FOR FEEDBACK SENSING," the entirety of which is incorporated herein by reference.

TECHNICAL FIELD

The present disclosure generally relates to radio transmissions and receptions for sensing changes in a physical environment. In particular, the present disclosure relates to alleviating computational burden for a receiver involved in the sensing.

BACKGROUND

Sensing can be performed by detecting changes in a wireless propagation channel. This can for example be applied to a system for Wireless Local Area Network (WLAN) as for example defined through IEEE 802.11.

A station (STA) receives multiple physical layer packets (known in IEEE 802.11 as Physical Protocol Data Units, PPDUs) and performs measurements on each PPDU. These measurements of the radio channel may reveal time variations in the channel, which are used to detect and classify the occurrence of events. Typical applications of WLAN sensing include home security (e.g. intruder detection), control of home appliances and health care (e.g. monitoring vital signs such as heart rate).

Sensing measurements can be classified according to the amount of bandwidth consumed by a measurement report:
  Coarse, such as Received Signal Strength Indicator (RSSI)
  Fine, such as Channel State Information (CSI), for example the frequency response of the propagation channel In some cases, the measurements used for WLAN sensing are performed by the same STA that supports sensing, while in other cases other STAs send feedback comprising the measurement reports to the STA that supports sensing. A STA that transmits PPDUs that are used to generate sensing measurements is called a sensing transmitter, while a STA that receives PPDUs that are used to generate measurement reports is called a sensing receiver.

In applications such as home security there can be several sensing receivers being triggered by one sensing transmitter.

In some applications it is desirable to enable the sensing receiver to perform sensing measurements at regular time intervals as for example discussed in submission IEEE 802.11-17/1850r0, "Wi-Fi Sensing: Technical Feasibility, Standardization Gaps", from November 2019 by Aerial Technologies Inc.

One objective of IEEE standardization of WLAN sensing is to define procedures that enable reliable channel measurements. Another objective is to minimize changes needed to software and firmware of 802.11 STAs to support the functionality of a sensing receiver.

Since an objective of the IEEE standardization is to define procedures that enable reliable channel measurements, it is desirable to prevent receiving STAs from performing measurements in vendor specific ways. Instead, it is desirable to require receiving STAs to perform measurements in consistent, standardized ways. This is difficult to achieve because the receiver algorithms in a STA usually are proprietary.

For example, IEEE 802.11 STAs often perform smoothing of the channel estimates in order to denoise the estimates. However, the smoothing algorithm is usually vendor dependent. Moreover, STAs do not always perform smoothing. Since the receiver algorithms are optimized for performance, there is no guarantee that one STA will apply the same channel estimation algorithm to two different received PPDUs. Likewise, different sensing receivers may use very different channel estimation algorithms so that even if both experience the same SNR, the measurement reports may have very different qualities (e.g. one STA may perform more effective denoising than another STA).

A possible solution is to standardize the exact measurement procedure (e.g. standardize the channel estimation algorithms). A first problem with this solution is that this requires an upgrade of the physical layer processing in the STA. A second problem is that not all sensing applications require the same reliability, so it may be necessary to standardize several measurement procedures.

Furthermore, due to the nature of the unlicensed bands and channel access using listen-before-talk, generating measurement reports at regular time intervals is challenging.

In summary, a flexible way to perform and report reliable measurements, preferably with low complexity, is needed.

The above information disclosed in this Background section is only for enhancement of understanding of the background of the disclosure and therefore it may contain information that does not form the prior art that is already known to a person of ordinary skill in the art.

SUMMARY

The disclosure is based on the inventors' realization that the sensing STA can instruct the sensing receiver to report the frequency/time domain received samples corresponding to selected Orthogonal Frequency Division Multiplexing (OFDM) symbols to the sensing STA. In this way the sensing STA may generate its own coarse or fine channel measurements according to its needs, and will be able to consistently determine the quality of the measurements According to a first aspect, there is provided a method of transmitting a Physical Protocol Data Unit, PPDU, for sensing changes in a physical environment, of a transmitter performing the method, through observing changes in a channel between the transmitter and a receiver. The method comprises transmitting a request for measurement of at least one symbol, wherein the request comprises an identifier and an indication of the at least one symbol, transmitting a signal comprising the at least one symbol, and receiving a measurement report for the at least one symbol.

The indication of the at least one symbol may comprise a time indication for the at least one symbol. The indication of the at least one symbol may comprise an indication of one or more fields in the PPDU.

The received measurement report may comprise at least one of: an indication of symbols corresponding to where the measurements are performed, a set of beamforming weights used at reception of the at least one symbol, samples acquired at reception of the at least one symbol, a channel estimate, a received signal strength indicator, and channel state information.

The transmitter and the receiver may be located in one device, and the transmitting of the request and the receiving of the measurement report may be performed on a wire within the device, and the transmitting of the signal may be performed over a radio interface.

The transmitter and the receiver may be located in different devices, and the transmitting of the request, the receiving of the measurement report, and the transmitting of the signal may be performed over a radio interface.

According to a second aspect, there is provided a computer program comprising instructions which, when executed on a processor of a transmitter, causes the transmitter to perform the method according to the first aspect.

According to a third aspect, there is provided a method of receiving a Physical Protocol Data Unit, PPDU, for aiding sensing changes in a physical environment of a transmitter transmitting the PPDU through observing changes in a channel between the transmitter and a receiver performing the method. The method comprises receiving a request for measurement of at least one symbol, wherein the request comprises an identifier and an indication of the at least one symbol, receiving a signal comprising the at least one symbol, performing measurements on the at least one symbol to provide a measurement report, and transmitting the measurement report.

The indication of the at least one symbol may comprise a time indication for the at least one symbol. The performing of measurements may be performed on one or more received symbols at a time corresponding to the time indication. The indication of the at least one symbol may comprise an indication of one or more fields in the PPDU.

The received measurement report may comprises at least one of: an indication of symbols corresponding to where the measurements are performed, a set of beamforming weights used at reception of the at least one symbol, samples acquired at reception of the at least one symbol, a channel estimate, a received signal strength indicator, and channel state information.

The transmitter and the receiver may be located in one device, and the receiving of the request and the transmitting of the measurement report may be performed on a wire within the device, and the receiving of the signal may be performed over a radio interface.

The transmitter and the receiver may be located in different devices, and the receiving of the request, the transmitting of the measurement report, and the receiving of the signal may be performed over a radio interface.

According to a fourth aspect, there is provided a computer program comprising instructions which, when executed on a processor of a receiver, causes the receiver to perform the method according to the third aspect.

According to a fifth aspect, there is provided a transmitter arranged for transmitting a Physical Protocol Data Unit, PPDU, for sensing changes in a physical environment of the transmitter through observing changes in a channel between the transmitter and a receiver. The transmitter is arranged to transmit a request for measurement of at least one symbol, wherein the request comprises an identifier and an indication of the at least one symbol, transmit a signal comprising the at least one symbol, and receive a measurement report for the at least one symbol.

The indication of the at least one symbol may comprise a time indication for the at least one symbol. The indication of the at least one symbol may comprise an indication of one or more fields in the PPDU.

The received measurement report may comprise at least one of: an indication of symbols corresponding to where the measurements are performed, a set of beamforming weights used at reception of the at least one symbol, samples acquired at reception of the at least one symbol, a channel estimate, a received signal strength indicator, and channel state information.

The transmitter and the receiver may be located in one device, and transmission of the request and reception of the measurement report may be performed on wire within the device, and the transmission of the signal may be performed over a radio interface of the transmitter.

The transmitter and the receiver may be located in different devices, and transmission of the request, reception of the measurement report, and transmission of the signal may be performed over a radio interface of the transmitter.

According to a sixth aspect, there is provided a receiver for receiving a Physical Protocol Data Unit, PPDU, for aiding sensing changes in a physical environment of a transmitter transmitting the PPDU through observing changes in a channel between the transmitter and the receiver. The receiver is arranged to receive a request for measurement of at least one symbol, wherein the request comprises an identifier and an indication of the at least one symbol, receive a signal comprising the at least one symbol, perform measurements on the at least one symbol to provide a measurement report, and transmit the measurement report.

The indication of the at least one symbol may comprise a time indication for the at least one symbol. The performing of the measurements may be performed on one or more received symbols at a time corresponding to the time indication. The indication of the at least one symbol may comprise an indication of one or more fields in the PPDU.

The received measurement report may comprise at least one of: an indication of symbols corresponding to where the measurements are performed, a set of beamforming weights used at reception of the at least one symbol, samples acquired at reception of the at least one symbol, a channel estimate, a received signal strength indicator, and channel state information.

The transmitter and the receiver may be located in one device, and reception of the request and transmission of the measurement report may be performed on a wire within the device, and reception of the signal may be performed over a radio interface of the receiver.

The transmitter and the receiver may be located in different devices, and reception of the request, the transmission of the measurement report, and the reception of the signal may be performed over a radio interface of the receiver.

The term "transmitter" of the fifth aspect and the term "receiver" of the sixth aspect refers to their main function in the context of this disclosure, but as is readily understood from the features demonstrated for them, they may in practice both be implemented as transceivers.

According to a seventh aspect, there is provided a device capable of sensing changes in a physical environment of the device through observing changes in a channel between a transmitter and a receiver. The device comprises the transmitter and the receiver. The transmitter is a transmitter according to the fifth aspect and the receiver is a receiver according to the sixth aspect.

The proposed approach alleviates computational burden on the receiver in the receiving STA, which is desirable in order to accelerate time to market and limit the implementation complexity. The sensing STA, which typically applies machine learning, artificial intelligence or other advanced signal processing techniques, may tune the estimation and measurement algorithms according to its needs, and would be able to determine by itself the quality of the measurements. In addition, when the sensing STA is the sensing transmitter, it can instruct the receiving STA to report the received samples corresponding to any OFDM symbol(s) in the sounding PPDU (including data symbols or packet extension symbols), and thus reduce jitter in the measurements, or use the samples to the increase the quality of the measurements (e.g. denoise the channel estimates).

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

The suggested approach introduces a protocol to enable a sensing receiver to deliver reliable measurement reports to a sensing STA.

Figure 1:
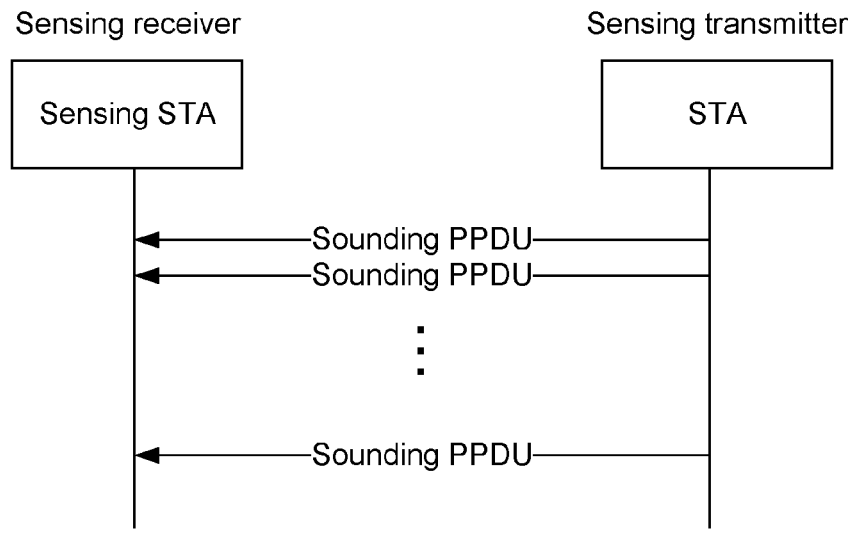
FIG. 1 illustrates one embodiment where the sensing STA comprises a sensing receiver.

FIG. 1 illustrates one embodiment where the sensing STA comprises a sensing receiver.

Figure 2:
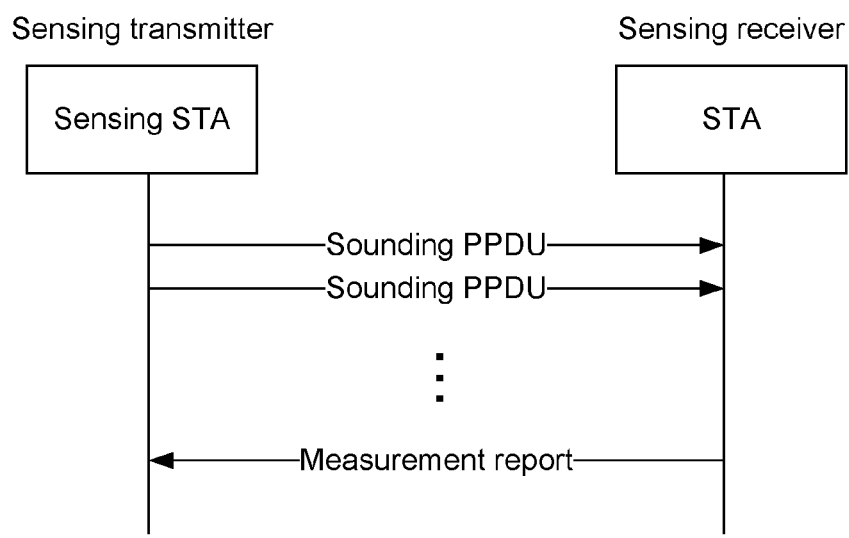
FIG. 2 illustrates an alternative role of STAs in WLAN sensing.

FIG. 2 illustrates an alternative role of STAs in WLAN sensing. In this example the sensing transmitter belongs to the STA that supports sensing and it triggers the sensing receivers to perform and report measurements.

Figure 3:
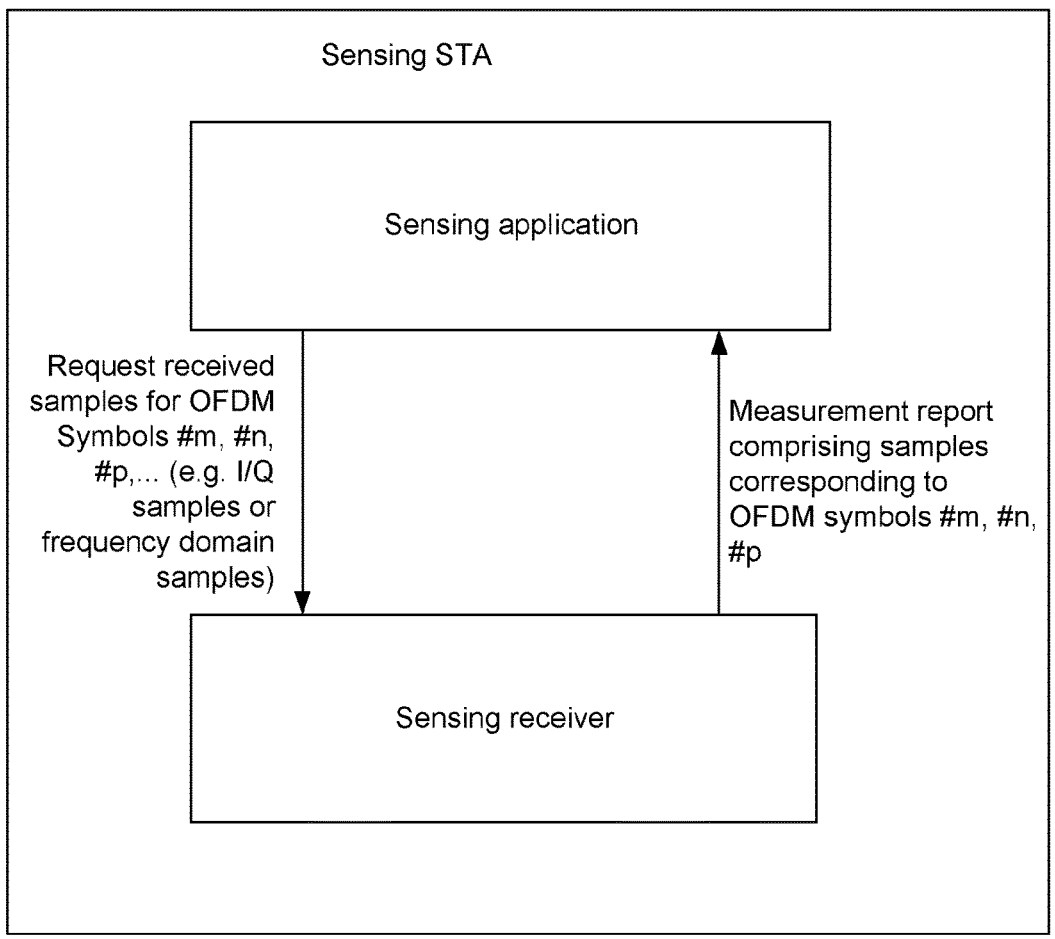
FIG. 3 illustrates the sensing STA requesting the sensing receiver to send the samples corresponding to the Legacy Long Training Symbol (L-LTF) and HE-LTFs.

The sensing STA selects some OFDM symbols and for each PPDU used for sensing purposes the sensing STA requests unfiltered I/Q time domain or frequency domain samples corresponding to the selected OFDM symbols. For example, if the PPDU is a High Efficiency (HE) PPDU, the sensing STA may request the sensing receiver to send the samples corresponding to the Legacy Long Training Symbol (L-LTF) and HE-LTFs as illustrated in FIG. 3.

Figure 4:
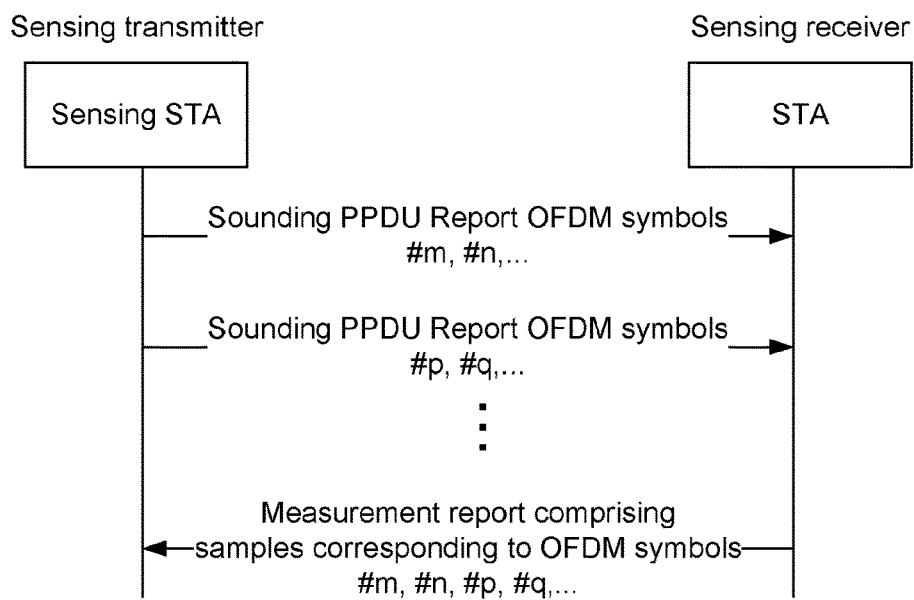
FIG. 4 illustrates that the sensing transmitter sends a burst comprising sounding PPDUs to the sensing receiver.

In another embodiment the sensing STA contains a sensing transmitter, as in FIG. 2. FIG. 4 illustrates that the sensing transmitter sends a burst comprising sounding PPDUs to the sensing receiver. The burst may comprise several PPDUs with diverse formats, such as Null Data Packet Announcement (NDPA), Null Data Packet (NDP) or others. The sensing STA sends a request to the sensing receiver comprising an identifier of the OFDM symbols in each PPDU for which the measurement report is desired. The receiving STA buffers the received signal samples (either in time or in frequency domain) corresponding to the indicated OFDM symbols, and feedbacks them to the sensing STA in one or more measurement reports. Since the sensing STA comprises the sensing transmitter, it knows the content of the PPDU and can perform measurements even in OFDM symbols carrying data.

Figure 5:
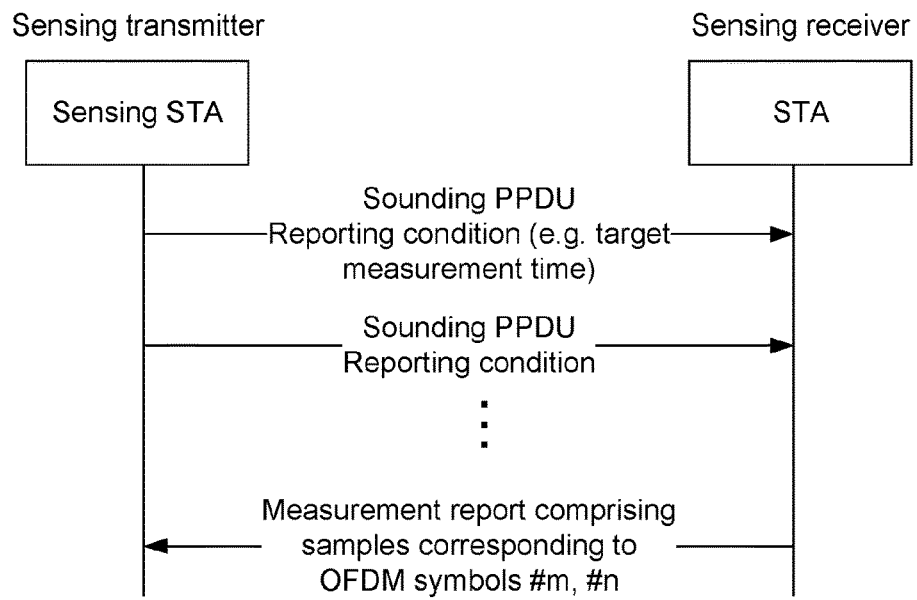
FIG. 5 illustrates another embodiment where the sensing STA contains a sensing transmitter, and the sensing transmitter sends a burst comprising sounding PPDUs to the sensing receiver.

FIG. 5 illustrates another embodiment where the sensing STA contains a sensing transmitter, and the sensing transmitter sends a burst comprising sounding PPDUs to the sensing receiver. In addition, the sensing STA gives an indication of a target time for measurement to the sensing receiver. The receiver replies with the samples corresponding to one or more OFDM symbols and indicates the symbol numbers or other OFDM symbol identifiers in the PPDU. For example, if the sounding PPDU also comprises data, has a duration of 2 ms, and comprises hundreds of OFDM symbols, the sensing receiver may choose among all the OFDM symbols in the PPDU the one closest to a desired sampling time for the channel, and sends a feedback report with the corresponding samples to the sensing STA, as well as an indication of which OFDM symbols these samples correspond to. Even if said symbols are data symbols or packet extension symbols, the sensing STA is able to produce the needed channel estimates since it knows the content of the sounding PPDU. In this way jitter in the measurements can be reduced.

IEEE 802.11n/ac/ax supports feedback of beamforming weights with varying resolution in the frequency domain and several quantization levels. For example, high resolution beamforming feedback comprises beamforming weights for each subcarrier (this is the frequency domain resolution), and with a resolution of 8 bits for the real and 8 bits for the imaginary part of each entry (this is the quantization resolution). The measurement reports could be requested using the same resolution levels in frequency domain and quantization as the beamforming feedback. In the case of Multiple Input Multiple Output (MIMO) PPDUs, the measurement reports may comprise the samples of the requested OFDM symbols for each receiver chain.

The sensing STA may also perform some operations on the samples in order to decrease the bandwidth needed for the feedback report. As a first example, the sensing STA may decimate or downsample the time or frequency domain samples before including them in a feedback report. As a second example, the sensing STA may group the subcarriers into non-overlapping groups consisting of adjacent subcarriers and compress the samples corresponding to each group, e.g. by averaging them and reporting only one average value for each group.

The examples above have been given in the context of WLAN and IEEE 802.11 for the sake of easier understanding from tangible examples, but it should be understood that the principles can be employed in any system having similar features, i.e., radio transmitter, radio receiver, and capabilities of sampling received signal and evaluating the channel from the samples.

Figure 6:
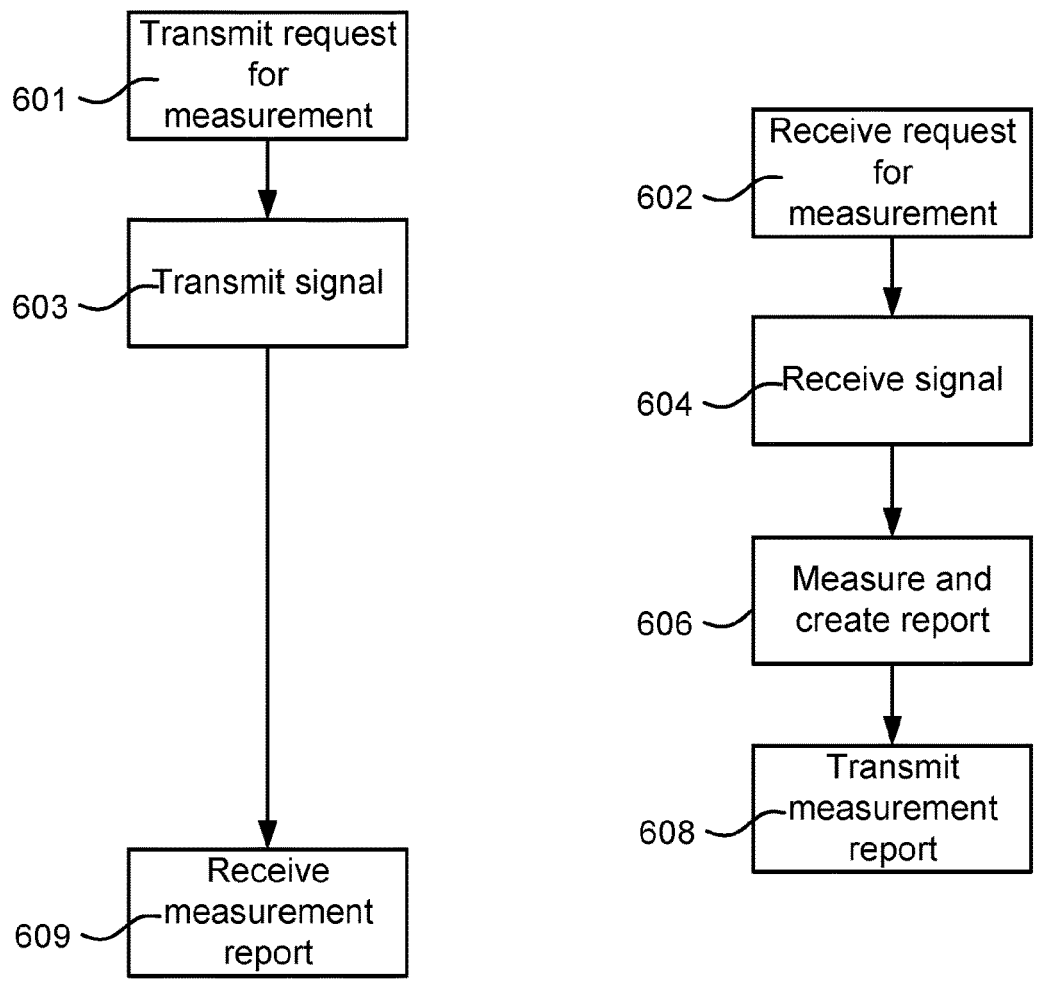
FIG. 6 is a flow chart illustrating a method according to some embodiments.

FIG. 6 is a flow chart illustrating a method according to some of the embodiments. For the sake of easier understanding, the transmitter operations are illustrated to the left, and receiver operations are illustrated to the right. In some embodiments, the transmitter operations and receiver operations are performed in different entities, whereas in other embodiments they are performed in the same entity.

The transmitter transmits 601 a request for measurement of at least one symbol, wherein the request comprises an identifier and an indication of the at least one symbol. The transmitter then transmits 603 a signal comprising the at least one symbol. A measurement report is then received 609 for the at least one symbol.

The receiver receives 602 the request for measurement of the at least one symbol, wherein the request comprises the identifier and the indication of the at least one symbol. Then the receiver receives 604 a signal comprising the at least one symbol. The receiver performs 606 measurements on the at least one symbol to provide a measurement report and then transmits 608 the measurement report.

Figure 7:
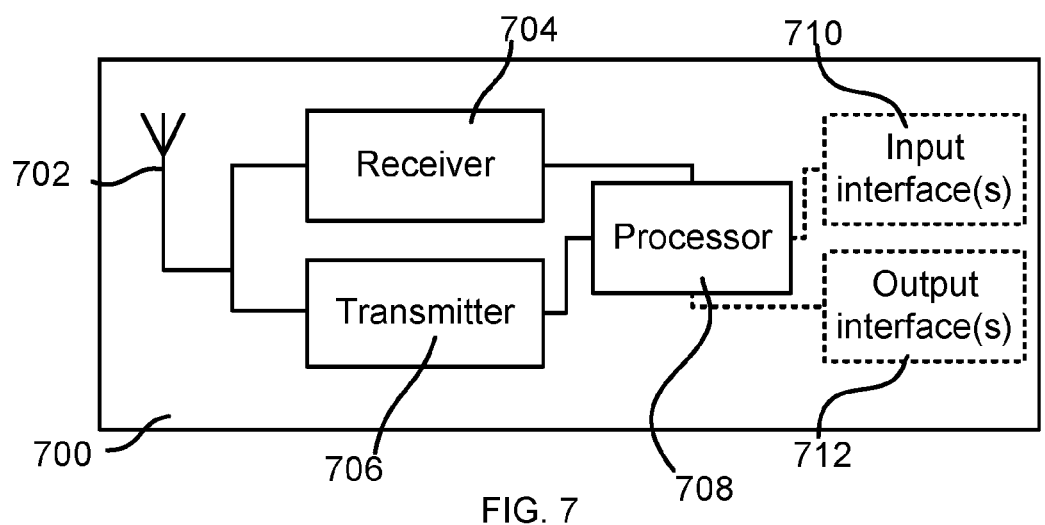
FIG. 7 is a block diagram schematically illustrating a STA according to an embodiment.

FIG. 7 is a block diagram schematically illustrating a STA 700 according to an embodiment. The STA 700 comprises an antenna arrangement 702, a receiver 704 connected to the antenna arrangement 702, a transmitter 706 connected to the antenna arrangement 702, a processing element 708 which may comprise one or more circuits, one or more input interfaces 710 and one or more output interfaces 712. The interfaces 710, 712 can be user interfaces and/or signal interfaces, e.g. electrical or optical. The STA 700 may be arranged to operate in a cellular communication network, a mesh communication network, or other communication network comprising a plurality of network nodes. In particular, by the processing element 708 being arranged to perform the embodiments demonstrated with reference to FIGS. 1 to 6, the STA 700 is capable of sensing transmission/reception. The processing element 708 can also fulfil a multitude of tasks, ranging from signal processing to enable reception and transmission since it is connected to the receiver 704 and transmitter 706, executing applications, controlling the interfaces 710, 712, etc.

Figure 8:
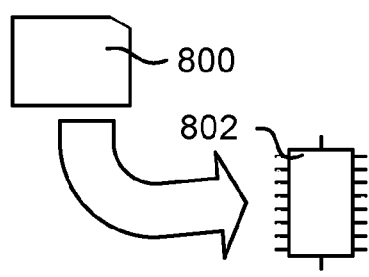
FIG. 8 schematically illustrates a computer-readable medium and a processing device.

The methods according to the present disclosure are suitable for implementation with aid of processing means, such as computers and/or processors, especially for the case where the processing element 708 demonstrated above comprises a processor handling sensing transmission/reception. Therefore, there is provided computer programs, comprising instructions arranged to cause the processing means, processor, or computer to perform the steps of any of the methods according to any of the embodiments described with reference to FIGS. 1 to 6. The computer programs preferably comprise program code which is stored on a computer readable medium 800, as illustrated in FIG. 8, which can be loaded and executed by a processing means, processor, or computer 802 to cause it to perform the methods, respectively, according to embodiments of the present disclosure, preferably as any of the embodiments described with reference to FIGS. 1 to 6. The computer 802 and computer program product 800 can be arranged to execute the program code sequentially where actions of the any of the methods are performed stepwise, or be performed on a real-time basis. The processing means, processor, or computer 802 is preferably what normally is referred to as an embedded system. Thus, the depicted computer readable medium 800 and computer 802 in FIG. 8 should be construed to be for illustrative purposes only to provide understanding of the principle, and not necessarily to be construed as any direct illustration of the elements.

Figure 9:
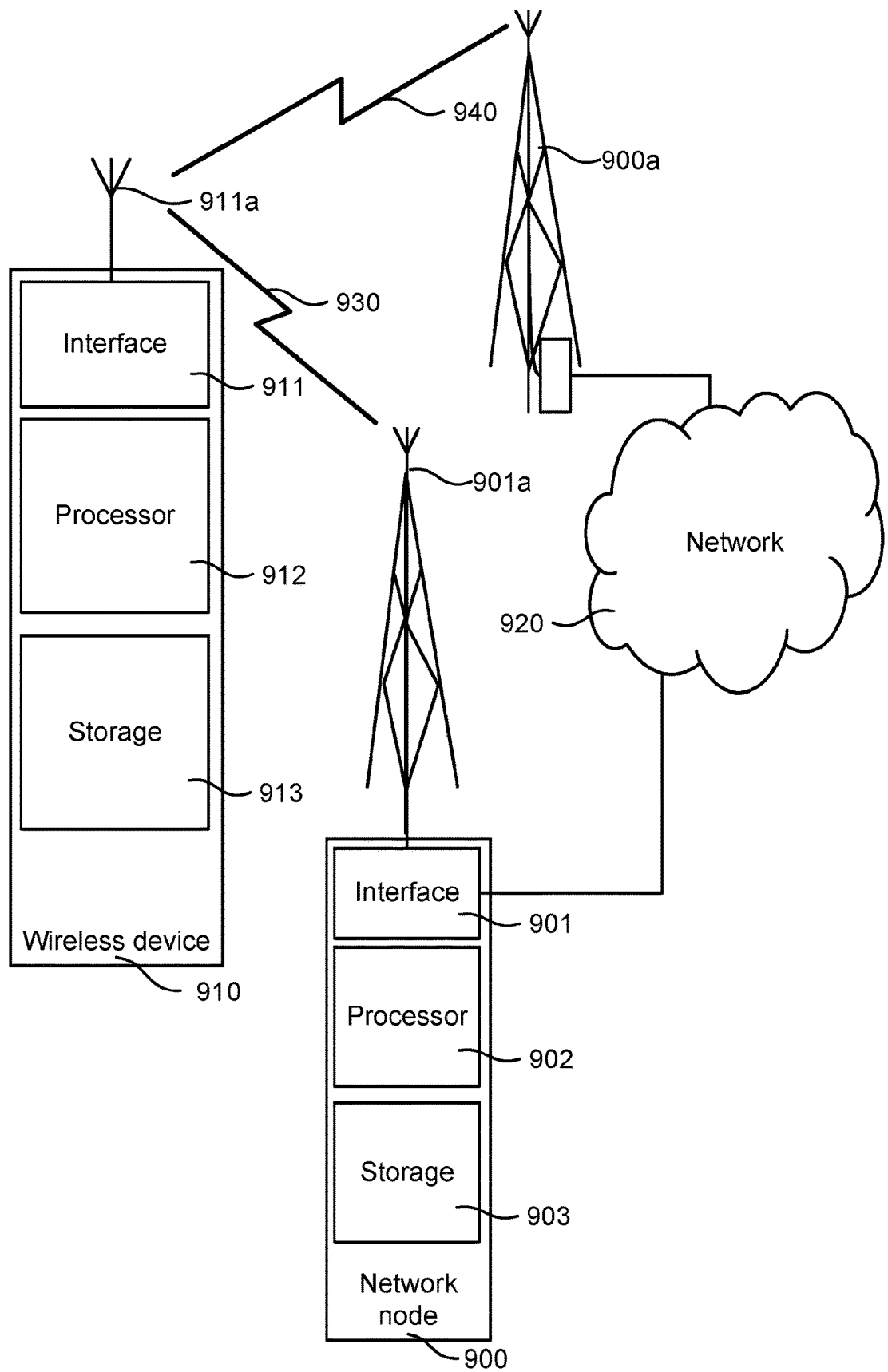
FIG. 9 illustrates a wireless network including network nodes and a wireless communication device.

FIG. 9 illustrates a wireless network comprising network (NW) nodes 900 and 900a, e.g. access points (APs), and a wireless device 910, e.g. a STA, with a more detailed view of the network node 900 and the communication device 910 in accordance with an embodiment. For simplicity, FIG. 9 only depicts a core network 920, network nodes 900 and 900a, and a communication device 910. Network node 900 comprises a processor 902, storage 903, interface 901, and antenna 901a. Similarly, the communication device 910 comprises a processor 912, storage 913, interface 911 and antenna 911a. These components may work together in order to provide network node and/or wireless device functionality as demonstrated above. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

The network 920 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. The network 920 may comprise a network node for performing any of the approaches demonstrated with reference to FIGS. 1 to 6, and/or an interface for signalling between network nodes 900, 900a.

The network node 900 comprises a processor 902, storage 903, interface 901, and antenna 901a. These components are depicted as single boxes located within a single larger box. In practice, however, a network node may comprise multiple different physical components that make up a single illustrated component (e.g., interface 901 may comprise terminals for coupling wires for a wired connection and a radio transceiver for a wireless connection). Similarly, network node 900 may be composed of multiple physically separate components, which may each have their own respective processor, storage, and interface components. In certain scenarios in which network node 900 comprises multiple separate components, one or more of the separate components may be shared among several network nodes. For example, a single controller may control multiple APs. In some embodiments, network node 900 may be configured to support multiple radio access technologies (RATs), e.g. different flavours of IEEE 802.11. In such embodiments, some components may be duplicated (e.g., separate storage 903 for the different RATs) and some components may be reused (e.g., the same antenna 901a may be shared by the RATs).

The processor 902 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 900 components, such as storage 903, network node 900 functionality. For example, processor 902 may execute instructions stored in storage 903. Such functionality may include providing various wireless features discussed herein to a wireless device, such as the wireless device 910, including any of the features or benefits disclosed herein.

Storage 903 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 903 may store any suitable instructions, data or information, including software and encoded logic, utilized by the network node 900. the storage 903 may be used to store any calculations made by the processor 902 and/or any data received via the interface 901.

The network node 900 also comprises the interface 901 which may be used in the wired or wireless communication of signalling and/or data between network node 900, network 920, and/or wireless device 910. For example, the interface 901 may perform any formatting, coding, or translating that may be needed to allow network node 900 to send and receive data from the network 920 over a wired connection. The interface 901 may also include a radio transmitter and/or receiver that may be coupled to or a part of the antenna 901a. The radio may receive digital data that is to be sent out to other network nodes or wireless devices via a wireless connection. The radio may convert the digital data into a radio signal having the appropriate channel and bandwidth parameters. The radio signal may then be transmitted via antenna 901a to the appropriate recipient (e.g., the wireless device 910).

The antenna 901a may be any type of antenna capable of transmitting and receiving data and/or signals wirelessly. In some embodiments, antenna 901a may comprise one or more omnidirectional, sector or panel antennas operable to transmit/receive radio signals between, for example, 2 GHz and 66 GHz. An omnidirectional antenna may be used to transmit/receive radio signals in all directions, a sector antenna may be used to transmit/receive radio signals from devices within a particular area, and a panel antenna may be a line of sight antenna used to transmit/receive radio signals in a relatively straight line. The antenna 901a may comprise one or more elements for enabling different ranks of SIMO, MISO or MIMO operation, or be capable of more or less complex beamforming.

The wireless device 910 may be a STA, but the principles above are applicable to any type of wireless communication device such as UE, D2D device or ProSe UE, etc., but may in general be any device, sensor, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine to machine (M2M) communication, etc., which is able to wirelessly send and receive data and/or signals to and from a network node, such as network node 900 and/or other wireless devices. In particular, the wireless device 910 is capable of communication as demonstrated above, e.g. in a . . . context. The wireless device 910 comprises a processor 912, storage 913, interface 911, and antenna 911a. Like the network node 900, the components of the wireless device 910 are depicted as single boxes located within a single larger box, however in practice a wireless device may comprises multiple different physical components that make up a single illustrated component (e.g., storage 913 may comprise multiple discrete microchips, each microchip representing a portion of the total storage capacity).

The processor 912 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 910 components, such as storage 913, wireless device 910 functionality. Such functionality may include providing various wireless features discussed herein, including any of the features or benefits disclosed herein.

The storage 913 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 913 may store any suitable data, instructions, or information, including software and encoded logic, utilized by the wireless device 910. The storage 913 may be used to store any calculations made by the processor 912 and/or any data received via the interface 911.

The interface 911 may be used in the wireless communication of signalling and/or data between the wireless device 910 and the network nodes 900, 900a. For example, the interface 911 may perform any formatting, coding, or translating that may be needed to allow the wireless device 910 to send and receive data to/from the network nodes 900, 900a over a wireless connection. The interface 911 may also include a radio transmitter and/or receiver that may be coupled to or a part of the antenna 911a. The radio may receive digital data that is to be sent out to e.g. the network node 901 via a wireless connection. The radio may convert the digital data into a radio signal having the appropriate channel and bandwidth parameters. The radio signal may then be transmitted via the antenna 911a to e.g. the network node 900.

The antenna 911a may be any type of antenna capable of transmitting and receiving data and/or signals wirelessly. In some embodiments, antenna 911a may comprise one or more omnidirectional, sector or panel antennas operable to transmit/receive radio signals between 2 GHz and 66 GHz. For simplicity, antenna 911a may be considered a part of interface 911 to the extent that a wireless signal is being used. The antenna 911a may comprise one or more elements for enabling different ranks of SIMO, MISO or MIMO operation, or more or less complex beamforming.

In some embodiments, the components described above may be used to implement one or more functional modules used for enabling measurements as demonstrated above. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by the processors 912 and/or 902, possibly in cooperation with the storage 913 and/or 903. The processors 912 and/or 902 and the storage 913 and/or 903 may thus be arranged to allow the processors 912 and/or 902 to fetch instructions from the storage 913 and/or 903 and execute the fetched instructions to allow the respective functional module to perform any features or functions disclosed herein. The modules may further be configured to perform other functions or steps not explicitly described herein but which would be within the knowledge of a person skilled in the art.

Certain aspects of the concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method of transmitting a Physical Protocol Data Unit, PPDU, for sensing changes in a physical environment, a transmitter performing the method, through observing changes in a channel between the transmitter and a receiver, the method comprising:
    transmitting a request for measurement of at least one symbol, the request comprising an identifier and an indication of the at least one symbol;
    transmitting a signal comprising the at least one symbol; and
    receiving a measurement report for the at least one symbol, the measurement report comprising samples acquired at reception of the at least one symbol.

2. The method of claim 1, wherein the indication of the at least one symbol comprises a time indication for the at least one symbol.

3. The method of claim 1, wherein the indication of the at least one symbol comprises an indication of one or more fields in the PPDU.

4. The method of claim 1, wherein the received measurement report further comprises at least one of:
    an indication of symbols corresponding to where the measurements are performed;
    a set of beamforming weights used at reception of the at least one symbol;
    a channel estimate;
    a received signal strength indicator; and
    channel state information.

5. The method of claim 1, wherein the transmitter and the receiver are located in one device, and wherein the transmitting of the request and the receiving of the measurement report are performed on a wire within the device, and the transmitting of the signal is performed over a radio interface.

6. The method of claim 1, wherein the transmitter and the receiver are located in different devices, and wherein the transmitting of the request, the receiving of the measurement report, and the transmitting of the signal are performed over a radio interface.

7. A device for sensing changes in a physical environment of the device through observing changes in a channel between a transmitter and a receiver, the device comprising:
    the transmitter, the transmitter being configured to:
        transmit a request for measurement of at least one symbol, the request comprising an identifier and an indication of the at least one symbol;
        transmit a signal comprising the at least one symbol; and
        receive a measurement report for the at least one symbol, the measurement report comprising samples acquired at reception of the at least one symbol; and
    the receiver being configured to:
        receive a request for measurement of at least one symbol, the request comprising an identifier and an indication of the at least one symbol;
        receive a signal comprising the at least one symbol;
        perform measurements on the at least one symbol to provide a measurement report; and
        transmit the measurement report.

8. A method of receiving a Physical Protocol Data Unit, PPDU, for aiding sensing changes in a physical environment of a transmitter transmitting the PPDU through observing changes in a channel between the transmitter and a receiver performing the method, the method comprising:
    receiving a request for measurement of at least one symbol, the request comprising an identifier and an indication of the at least one symbol;
    receiving a signal comprising the at least one symbol;
    performing measurements on the at least one symbol to provide a measurement report; and
    transmitting the measurement report, the measurement report comprising samples acquired at reception of the at least one symbol.

9. The method of claim 8, wherein the indication of the at least one symbol comprises a time indication for the at least one symbol.

10. The method of claim 9, wherein the performing of measurements is performed on one or more received symbols at a time corresponding to the time indication.

11. The method of claim 8, wherein the indication of the at least one symbol comprises an indication of one or more fields in the PPDU.

12. The method of claim 8, wherein the transmitted measurement report further comprises at least one of:
    an indication of symbols corresponding to where the measurements are performed;
    a set of beamforming weights used at reception of the at least one symbol;
    a channel estimate;
    a received signal strength indicator; and
    channel state information.

13. The method of claim 8, wherein the transmitter and the receiver are located in one device, and wherein the receiving of the request and the transmitting of the measurement report are performed on a wire within the device, and the receiving of the signal is performed over a radio interface.

14. The method of claim 8, wherein the transmitter and the receiver are located in different devices, and wherein the receiving of the request, the transmitting of the measurement report, and the receiving of the signal are performed over a radio interface.

15. A transmitter arranged for transmitting a Physical Protocol Data Unit, PPDU, for sensing changes in a physical environment of the transmitter through observing changes in a channel between the transmitter and a receiver, the transmitter being configured to:
    transmit a request for measurement of at least one symbol, the request comprising an identifier and an indication of the at least one symbol;
    transmit a signal comprising the at least one symbol; and
    receive a measurement report for the at least one symbol, the measurement report comprising samples acquired at reception of the at least one symbol.

16. The transmitter of claim 15, wherein the transmitter and the receiver are located in different devices, and wherein transmission of the request, reception of the measurement report, and transmission of the signal are performed over a radio interface of the transmitter.

17. The transmitter of claim 15, wherein the indication of the at least one symbol comprises a time indication for the at least one symbol.

18. The transmitter of claim 15, wherein the indication of the at least one symbol comprises an indication of one or more fields in the PPDU.

19. The transmitter of claim 15, wherein the received measurement report further comprises at least one of:
    an indication of symbols corresponding to where the measurements are performed;
    a set of beamforming weights used at reception of the at least one symbol;

a channel estimate;
a received signal strength indicator; and
channel state information.

20. The transmitter of claim 15, wherein the transmitter and the receiver are located in one device, and wherein transmission of the request and reception of the measurement report are performed on wire within the device, and the transmission of the signal is performed over a radio interface of the transmitter.

21. A receiver for receiving a Physical Protocol Data Unit, PPDU, for aiding sensing changes in a physical environment of a transmitter transmitting the PPDU through observing changes in a channel between the transmitter and the receiver, the received being configured to:
    receive a request for measurement of at least one symbol, the request comprising an identifier and an indication of the at least one symbol;
    receive a signal comprising the at least one symbol;
    perform measurements on the at least one symbol to provide a measurement report; and
    transmit the measurement report, the measurement report comprising samples acquired at reception of the at least one symbol.

22. The receiver of claim 21, wherein the transmitter and the receiver are located in different devices, and wherein reception of the request, the transmission of the measurement report, and the reception of the signal are performed over a radio interface of the receiver.

23. The receiver of claim 21, wherein the indication of the at least one symbol comprises a time indication for the at least one symbol.

24. The receiver of claim 23, wherein performing the measurements is performed on one or more received symbols at a time corresponding to the time indication.

25. The receiver of claim 21, wherein the indication of the at least one symbol comprises an indication of one or more fields in the PPDU.

26. The receiver of claim 21, wherein the transmitted measurement report further comprises at least one of:
    an indication of symbols corresponding to where the measurements are performed;
    a set of beamforming weights used at reception of the at least one symbol;
    a channel estimate;
    a received signal strength indicator; and
    channel state information.

27. The receiver of claim 21, wherein the transmitter and the receiver are located in one device, and wherein reception of the request and transmission of the measurement report are performed on a wire within the device, and reception of the signal is performed over a radio interface of the receiver.

* * * * *